H. G. GINACA.
MACHINE FOR TRIMMING FRUIT.
APPLICATION FILED MAY 22, 1912.

1,060,249.

Patented Apr. 29, 1913.

3 SHEETS—SHEET 3.

Witnesses.

Inventor.

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

MACHINE FOR TRIMMING FRUIT.

1,060,249.   Specification of Letters Patent.   Patented Apr. 29, 1913.

Application filed May 22, 1912. Serial No. 698,995.

*To all whom it may concern:*

Be it known that I, HENRY GABRIEL GINACA, a citizen of the United States, residing at Honolulu, in the county of Honolulu, Territory of Hawaii, have invented certain new and useful Improvements in Machines for Trimming Fruit; and I do hereby declare the following to be a full, clear, and exact description of the invention, such as will enable others skilled in the art to which it appertains to make and use the same.

This invention relates to machines for trimming fruit, such as pineapples, and particularly for trimming the good portion of fruit from the rind.

The object of the present invention is to produce a machine for straightening out the barrel shaped outer portion of the fruit, which has been removed in the process of sizing, and for separating the good portion of the fruit thereof from the outer and harder rind, and for accomplishing all of same in a rapid and automatic manner.

The invention is particularly applicable for the treatment of the shells or outer portions of pineapples discharged from machines which size the fruit, such as are described in my application for patent entitled Machine for treating fruit, filed April 30, 1912, Serial No. 694,081.

My invention contemplates a horn shaped plate upon which the barrel shaped outer portion of the fruit is fed to the machine, means for then moving the outer portion of the fruit rearward and straightening or flattening out same, means for trimming off the good portion of fruit from the harder rind while being moved rearward firmly gripped between a plurality of revolving rings and a flexible belt, and means for discharging the rind.

The invention consists in the novel construction and arrangement of parts as hereinafter described and claimed, reference being had to the accompanying drawings, forming a part of this specification, in which similar characters of reference indicate corresponding parts in the several views.

Figure 1:
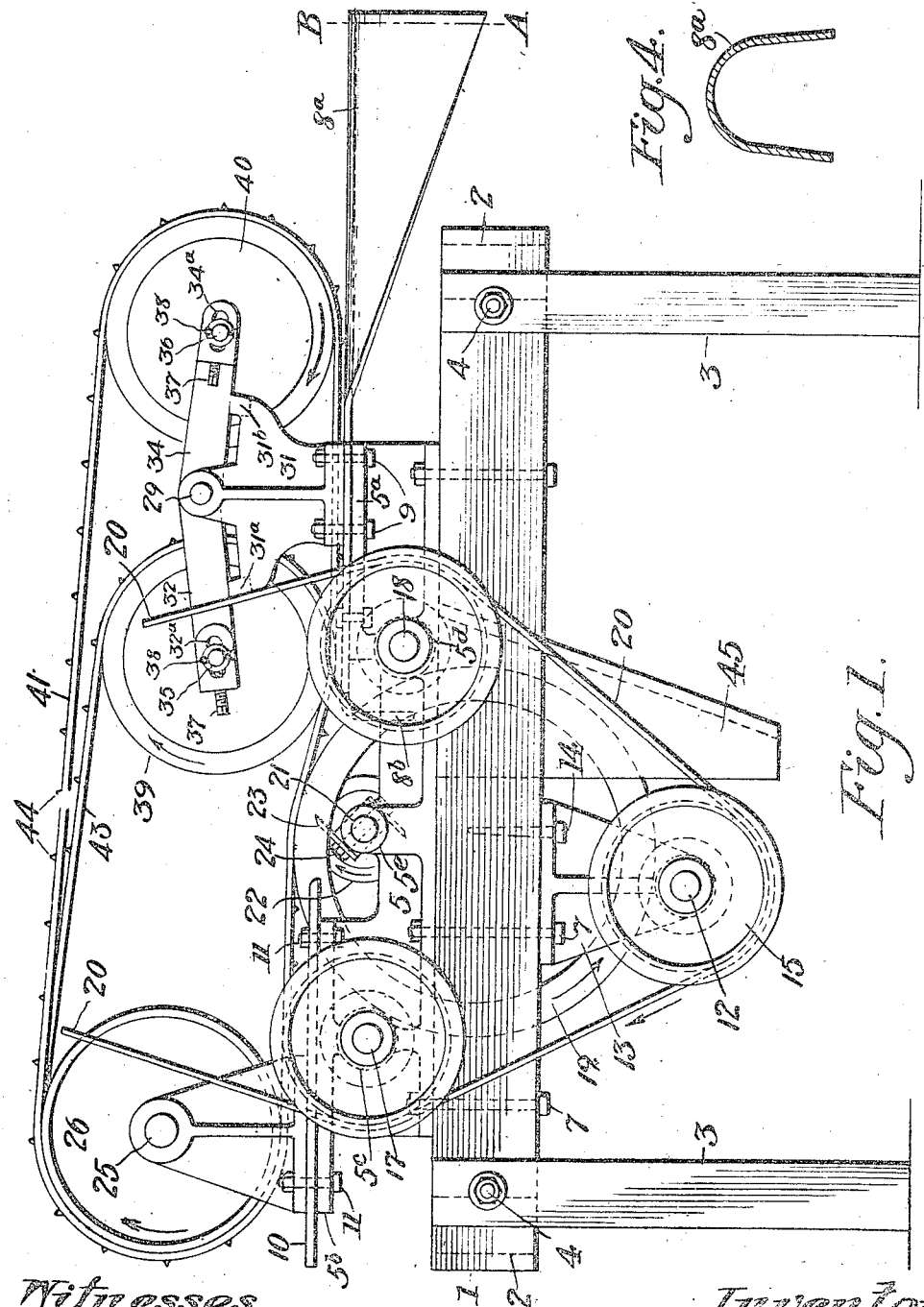
Figure 2:
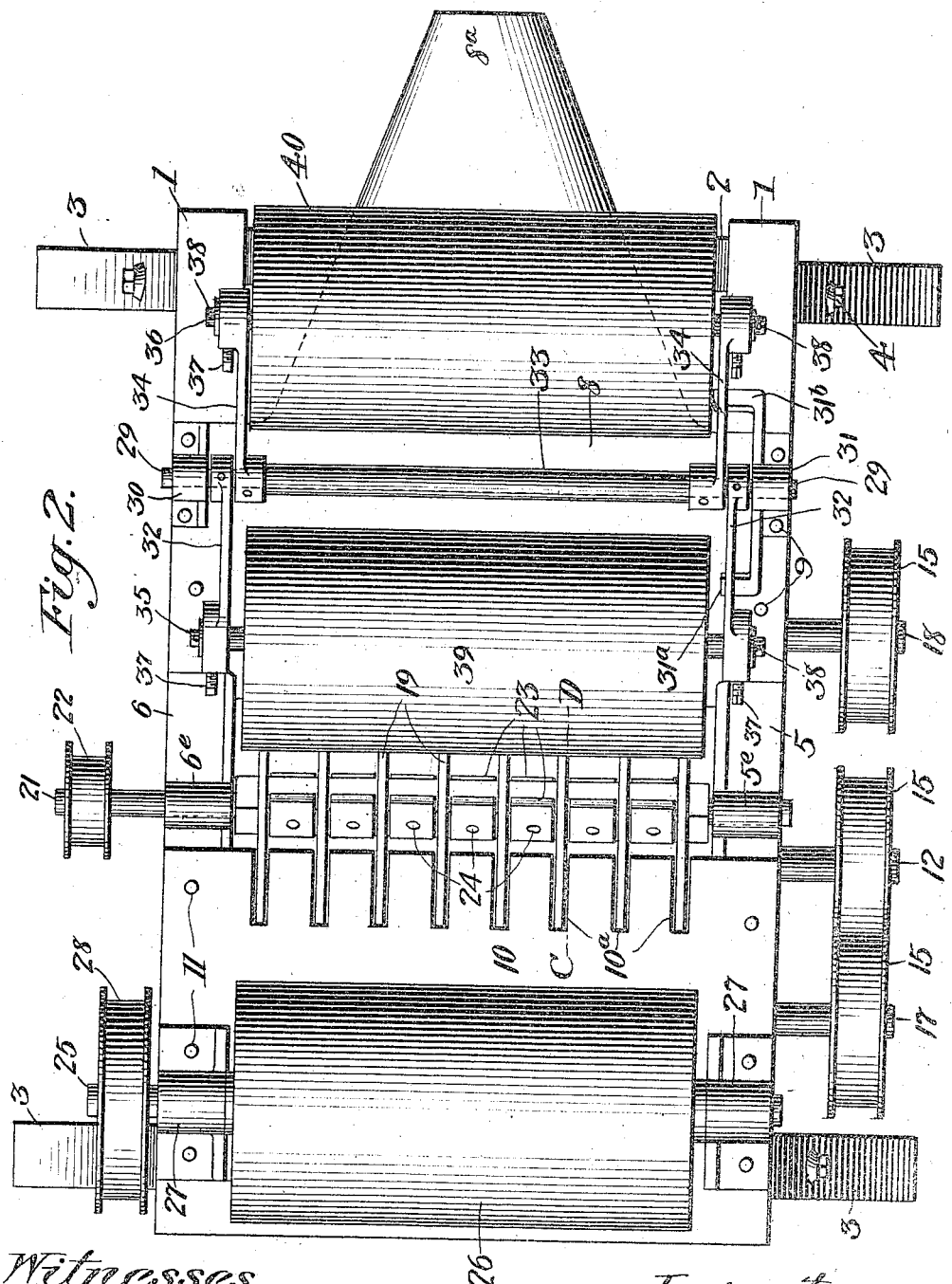
Figure 3:
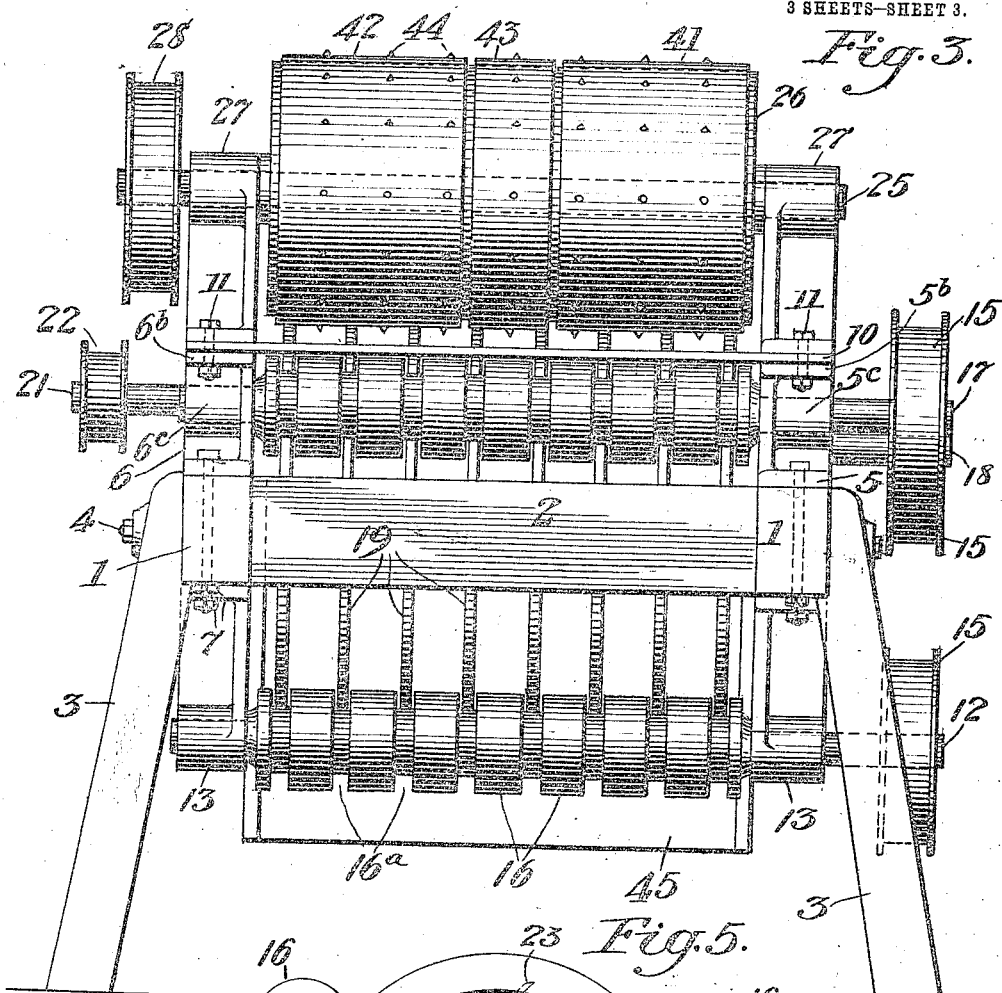
Figure 5:
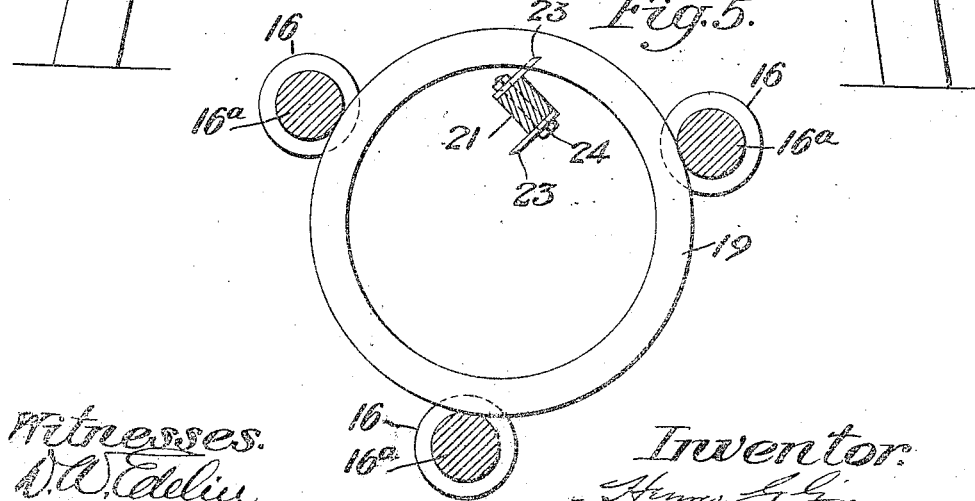

Figure 1 is a side elevation of a machine for trimming fruit embodying my present invention. Fig. 2 is a top plan view of the same with all belts removed for the sake of clearness. Fig. 3 is a rear elevation of the machine. Fig. 4 is a section of the horn on the line A—B of Fig. 1. Fig. 5 is a section on the line C—D of Fig. 2.

Referring to the drawings, the frame of the machine is composed of the two longitudinal beams 1, the two transverse beams 2 and the legs 3, all firmly bolted together by the bolts 4. The castings 5 and 6, bolted by the bolts 7 upon the longitudinal beams 1, are made right and left hand but are otherwise similar.

The feed plate 8 is secured by the bolts 9 to the tops of the horizontal flanges $5^a$ provided at the front ends of the castings 5 6 respectively. The corners of the front end of the feed plate 8 are bent or curved downward to form the horn $8^a$ as shown. The discharge plate 10 is secured by the bolts 11 to the tops of the horizontal flanges $5^b$ $6^b$ at the rear ends of the castings 5 6 respectively. This discharge plate 10 is preferably located in a slightly higher plane than the feed plate 8. The front edge of the discharge plate 10 is provided with notches $10^a$, eight being shown in Fig. 2. The rear end of the feed plate 8 is preferably bent downward and provided with notches $8^b$ corresponding to the notches $10^a$ in the discharge plate 10.

The shaft 12 is journaled transversely in the bracket bearings 13 bolted to the underside of each of the longitudinal beams 1 by the bolts 7 and the lag screws 14, Fig. 1. The flanged pulley 15 is secured to one end of this shaft 12, and a roller 16 provided with grooves $16^a$ is fastened to said shaft between the bracket bearings 13, Fig. 3. The spacing of the grooves $16^a$ is the same as the spacing of the notches $8^b$ and $10^a$ in the feed and discharge plates respectively. Two similar shafts 17 and 18 are journaled in bearings formed in the bosses $5^c$ $6^c$ and $5^d$ of the castings 5 and 6 respectively. The three shafts 12 17 and 18 are located at equal distances apart, to form an equilateral triangle. The shafts 17 18 are each provided with a flanged pulley 15 and a roller 16 having grooves $16^a$ exactly the same as provided for the shaft 12. The rings 19 are adapted to turn between the three rollers 16 in the grooves 16ᵃ when said rollers are revolved. The upper edges or tops of the rings 19 are slightly higher than the discharge plate 10. The rings 19 are adapted to turn in the notches 8ᵇ and 10ᵃ and clear the feed plate 8 and discharge plate 10. The three shafts 12 17 18 are revolved at the same speed by means of a belt 20 passing over the three pulleys 15 as shown in Fig. 1.

The knife shaft 21, is journaled in the bearings 5ᵉ 6ᵉ of the castings 5 6 respectively, and can be rapidly revolved by means of a belt applied to the pulley 22 secured to one end of said shaft. Between the bearings 5ᵉ and 6ᵉ the shaft 21 has a square cross section, to opposite sides of which the knives 23 are bolted by the bolts 24, and so located that these knives operate between the rings 19 and clear same when the shaft 21 is revolved.

The shaft 25 provided with the drum 26 is journaled in the bracket bearings 27 bolted by the bolts 11 upon the sides of the discharge plate 10 and above the flanges 5ᵇ 6ᵇ of the castings 5 and 6 respectively. The shaft 25 is revolved by means of a belt applied to the pulley 28 secured to the end of said shaft, Figs. 2 and 3. The bar 29 is supported in the brackets 30 and 31 bolted by the bolts 9 upon the sides of the feed plate 8 and above the flanges 5ᵃ 6ᵃ of the castings 5 and 6 respectively. A lever 32 is secured to the bar 29 next to each of the brackets 30 and 31. The pipe 33 surrounds the bar 29 between the levers 32. A lever 34 is fastened to each end of the pipe 33. The end of each of the levers 32 34 is provided with a slot 32ᵃ 34ᵃ to receive the bars 35 36 respectively, and also with an adjusting screw 37. Cotter pins 38 are provided in the ends of the bars 35 and 36. The drums 39 and 40 are adapted to turn on the bars 35 and 36 respectively. The bracket 31 is provided with arms 31ᵃ and 31ᵇ adapted to form stops to engage an adjacent lever 32 and 34 and thereby limit the downward movement of each of said levers due to the weight of the drums 39 and 40 respectively. Two endless belts 41 42 are stretched over the drums 26 and 40, and a shorter and narrower belt 43 is stretched over the drums 26 and 39 between the belts 41 and 42, Figs. 1 and 3. Of course, if preferred, a single wide belt may be employed and be stretched over the drums 26 and 40, in lieu of the three belts shown. The belts 41 42 and 43 may be provided with tacks or other projections 44 adapted to engage the rind of the fruit, these projections being preferably arranged in rows so as to clear the rings 19, Fig. 3.

A discharge chute 45 for the fruit trimmed from the rind is provided between the longitudinal beams 1 in front of the rings 19, Figs. 1 and 3.

When the drums 39 and 40 are in their lowest positions, with the levers 32 and 34 engaging the arms 31ᵃ and 31ᵇ, the projections 44 on the belts 41 42 and 43 just clear the feed plate 8. The weight of the drum 39 deflects said belts and causes them to have a greater contact with the rings 19 than they otherwise would have. When the outer portion of the fruit to be treated is passed between the belts 41 42 and the feed plate 8, the drum 40 is lifted thereby more or less depending upon the thickness of said fruit, the pipe 33 turning on the bar 29. The drum 39 is similarly lifted by the fruit, the bar 29 turning in the brackets 30 31. The tightness of the belts 41 42 may be adjusted by means of the screws 37 which move the bar 36 in the slots 34ᵃ. The belt 43 may be similarly adjusted by moving the bar 35 in the slots 32ᵃ by means of the screws 37 in the ends of the levers 32. The three belts 41 42 43 are propelled by the drum 26 in the direction indicated by arrows in Fig. 1. The speed of the three belts 41 42 and 43 is the same as the circumferential speed of the rings 19.

In operation with the revolving parts moving in the directions as indicated by arrows in Fig. 1, the barrel shaped outer portions of the fruit which result from the sizing operation are placed successively on the horn 8ᵃ and are moved rearward thereon until the projections 44 in the belts 41 42 engage same and drag it rearward upon the feed plate 8. These portions of fruit in being thus moved, however, from the horn 8ᵃ onto the feed plate 8, are flattened or straightened out from their original circular shape and have been spread upon the feed plate 8 with the rind upward. Continuing rearward the belt 43 soon also engages the rind, which is now dragged rearward by all three belts 41 42 43, and upon leaving the rear end of the feed plate 8 is carried rearward gripped between said belts and the rings 19 and then onto the discharge plate 10. During this passage, however, and while gripped, the good portion of the fruit has been trimmed from the hard rind by the revolving knives 23 which encounter and cut off that portion of the soft fruit forced by the belts into the intervals or spaces between the rings 19. The good fruit thus trimmed drops down the chute 45. The rind is pulled rearward by the belts and is discharged from the machine over the rear of the discharge plate 10.

The object of preferably bending downward the rear end of the feed plate 8 is to act as a baffle for the trimmed fruit and prevent the latter from coming in contact with the roller 16 on the shaft 18. The object of the drum 39 in addition to the drum 40 is to provide means for pressing the belts 41 42 43 firmly against the rings 19 above the shaft 21 and increase the contact between these belts and rings. Another object is to cause the belts 41 and 42 to travel approximately parallel to the feed plate 8.

I claim:—

1. A machine for trimming fruit comprising, a frame, a feed plate, means for moving the fruit over the feed plate, a plurality of revoluble rigid rings, means for pressing the fruit against said rings, means for trimming the fruit while so pressed, a discharge plate, and means for discharging the rind.

2. In a machine for trimming fruit, a feedplate horn having a convex surface at its forward end, and a surface of less convexity at the end adjacent the machine and a belt for moving the fruit rearward on said plate when the barrel shaped fruit has been moved rearward on the horn for the purpose of flattening or straightening out said fruit.

3. In a machine for trimming fruit, a plurality of rigid spaced rings and a flexible belt coöperating with said rings to firmly grip the fruit between said rings and said belt.

4. In a machine for trimming fruit, a plurality of rigid rings, a flexible belt coöperating with said rings to grip the fruit between said rings and belt, and means for trimming off the good portion of the fruit from the rind while the fruit is thus gripped.

5. In a machine for trimming fruit, a plurality of rigid rings, a flexible belt coöperating with said rings to grip the fruit between said rings and belt, and means for moving the belt and for revolving the rings such that the periphery of the rings has the same velocity as the belt.

6. In a machine for trimming fruit, a plurality of rigid rings, a flexible belt coöperating with said rings to grip the fruit between said rings and belt, means for moving the belt and for revolving the rings, and means for trimming off the good portion of the fruit from the rind while the fruit is thus gripped.

7. In a machine for trimming fruit, a plurality of independent rigid rings, means for revolving said rings and guiding the same in parallel planes, and knives having their support within the rigid rings.

8. In a machine for trimming fruit, a plurality of independent rigid rings having a common axis, means for revolving said rings, and knives having their support within the rigid rings.

9. In a machine for trimming fruit, a plurality of independent rigid rings having a common axis, means for revolving said rings and guiding the same in parallel planes, and knives having their support within the rigid rings.

10. In a machine for trimming fruit, a plurality of rigid rings, means for revolving and guiding said rings in parallel planes, and a knife shaft revolving within said rings with its axis parallel to the common axis of the rings.

11. In a machine for trimming fruit, a plurality of rigid rings, means for revolving and guiding said rings in parallel planes, a knife shaft revolving within said rings with its axis parallel to the common axis of the rings, and a plurality of knives attached to said shaft adapted to operate between said rings.

In testimony whereof I affix my signature, in presence of two witnesses.

HENRY GABRIEL GINACA.

Witnesses:
ARTHUR F. EWART,
ROBT. J. PRATT.